April 9, 1963  J. T. GONDEK  3,084,710
PRESSURE RELIEF VALVE
Filed Dec. 14, 1959

INVENTOR
John T. Gondek
BY
ATTORNEY

United States Patent Office 3,084,710
Patented Apr. 9, 1963

3,084,710
PRESSURE RELIEF VALVE
John T. Gondek, 2206 Roosevelt St. NE.,
Minneapolis 18, Minn.
Filed Dec. 14, 1959, Ser. No. 859,228
1 Claim. (Cl. 137—514)

This invention relates to an improvement in pressure relief valve and deals particularly with a valve which functions effectively and smoothly and may if desired operate under low differentials of pressure.

Numerous types of pressure relief valves have been produced which are designed to open when subjected to a sufficient pressure differential and to permit the escape of fluid. Most such valves have quite a noticeable leakage when the valve is subjected to a pressure equal to about 40% of the blow point where the valve is intended to open to release pressure. It is the object of the present invention to provide a valve which functions with very little leakage until it is subjected to a pressure sufficient to cause the valve to blow.

It is a feature of the present invention to provide a valve including a slidable plunger which acts against spring pressure, the plunger being hydraulically moved when sufficient pressure is built up. Movement of the plunger is dampened by engaging a portion of the spring guide which moves with the plunger in the closed socket axially of the valve. In order to move to pressure relief position, it is necessary for the fluid within the socket to leak past the portion of the guide engaged therein, thus dampening the movement of the plunger.

These and other objects and novel features of the present invention will be more clearly and fully set forth in the following specification and claim.

In the drawings forming a part of the specification:

Figure 1:
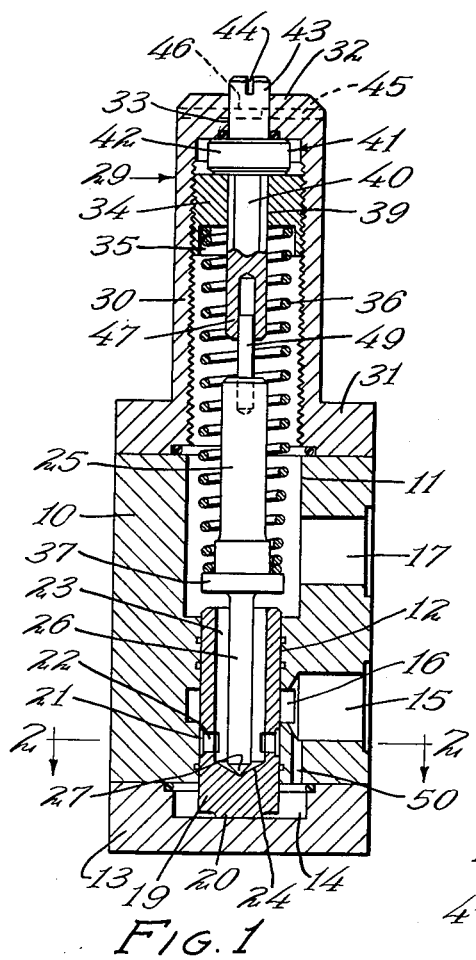
FIGURE 1 is a sectional view through the pressure relief valve showing the general arrangement of parts therein.

The pressure relief valve is constructed as best illustrated in FIGURE 1 of the drawings and includes a central body portion 10 having an axial relatively large diameter bore portion 11 communicating with its upper end and a relatively smaller diameter axial bore portion 12 connecting the bore 11 to the lower end of the central body portion. A cap 13 is secured to the central body portion 10 in any suitable manner to form a bottom closure for a valve. The cap 13 includes an axial socket 14 which is of somewhat larger internal diameter than the lower bore portion 12.

An inlet port 15 leads radially into the body portion 10 and communicates with a groove 16 extending peripherally about the wall of the bore 12. An outlet port 17 also extends radially into the body 10 and communicates with the relatively large diameter upper bore portion 11.

A valve plunger 19 is slidably supported within the small diameter bore 12 and includes a short axial projection 20 at its lower end which may abut against the bottom of the axial socket 14 to hold a portion of the valve plunger 19 spaced from the bottom of the socket 14 and thus to permit fluid under pressure to engage against the lower end of the plunger. The plunger 19 is provided with a shallow groove 21 about its periphery, the groove 21 being below the level of the groove 16 in the body 10 when the plunger 19 is in its normal position engaged against the bottom of the socket 14. A series of radially extending passages 22 extend through the wall of the plunger to communicate with an axial socket 23 extending into the plunger from the upper end thereof and terminating above the lower plunger end. The base 24 of the socket 23 is preferably of conical shape.

A spring guide 25 is supported in the bores 11 and 12 and includes a shank 26 which extends freely into the socket 23 in spaced relation to the walls of the socket. The shank 26 is provided with a conical end 27 of steeper taper than the bottom 24 of the socket 23 so as to remain centered with respect to the socket.

The valve also includes a top closure member 29 which includes an internally threaded sleeve 30 which forms a continuation of the large diameter bore portion 11 and which is secured in fixed relation to the upper end of the body 10 in any suitable way. The lower end of the sleeve 30 is provided with a mounting flange 31 which is preferably of equal outer diameter to the body 10. The sleeve 30 includes a top closure 32 having an axial opening 33 extending therethrough which communicates with the interior of the sleeve 30. A plug 34 having a socket in lower end 35 is designed to confine the upper end of a spring 36. The opposite end of the spring 36 bears against a shoulder 37 on the spring guide 25, the lower end of the spring tapering in diameter to properly locate the spring. The plug 34 is provided with an axial multi sided aperture 39 extending therethrough and which is designed to accommodate a similarly shaped shank 40 of a plug adjusting member indicated in general by the numeral 41. The spring adjustment member 41 includes a bearing flange 42 and an axial shank 43 which extends through the aperture 33 in the sleeve end 32. The shank 33 is slotted as indicated in 44 to accommodate a screw driver so that the shank 43 may be rotated. A pin 45 extends through a portion of the sleeve closure 32 and extends into a groove 46 in the shank 43 to hold the shank and the remainder of the spring adjustment member 41 from axial movement relative to the sleeve end 32.

The lower end of the shank 40 of the spring adjustment member 41 is provided with an axial socket 47 designed to slidably accommodate a pin 49 projecting from the upper end of the spring guide 25. The socket 47 forms a pocket or dash pot within which hydraulic fluid may be maintained and the engagement of the pin 49 in the socket 47 provides a dampening action to the movement of the spring guide due to the fact that fluid must escape from the socket as the pin 49 moves upwardly and as fluid must be drawn into the socket as the pin 49 moves downwardly therein.

In operation, the inlet port 15 is connected to the fluid pressure line to receive fluid under pressure therefrom. This fluid under pressure may flow into the groove 16 which is closed by the wall of the plunger 19. However, the fluid under pressure is free to flow through a small diameter passage 50 into the socket 14 to exert force against the under surface of the plunger 19. This upward force is normally resisted by the spring 36 so that the valve remains closed.

If the pressure in the port 15 continues to build up to a predetermined maximum or blow point, the upward pressure against the lower end of the plunger 19 becomes sufficient to move the plunger upwardly, compressing the spring 36. As the plunger moves upwardly, the groove 21 comes into registry with the groove 16 and fluid under pressure is permitted to escape through the opening 22 and the portion of the socket 23 surrounding the shank 26, the fluid under pressure being allowed to leave the valve body through the port 17.

Upward movement of the plunger 19 and spring guide 25 acts to urge the pin 49 into the socket 47, dampening the upward movement of the spring guide and plunger and making the action extremely smooth. The plunger 19 remains stationary until sufficient pressure is built up in the socket 14 to raise the plunger. Once the plunger has raised slightly, the pressure in the socket 14 may act against the entire lower end of the plunger thus moving the relief valve from closed position to open position when sufficient pressure is built up.

Figure 2:
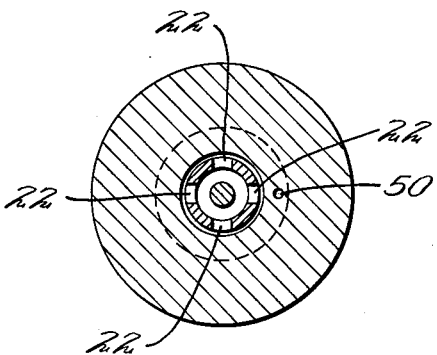
FIGURE 2 is a cross sectional view through the valve, the position of the section being indicated by the line 2—2 of FIGURE 1.
Figure 3:
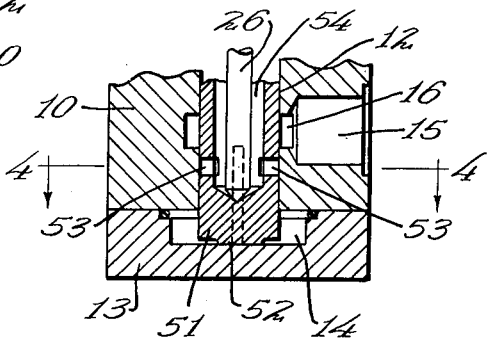
FIGURE 3 is a sectional view through a portion of the valve, showing a slightly modified form of construction.
Figure 4:
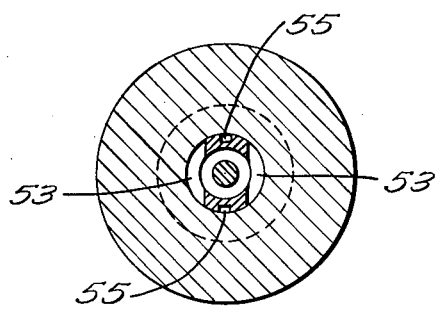
FIGURE 4 is a sectional view through the modified form of valve, the position of the section being indicated by the line 4—4 of FIGURE 3.

In some instances the passage 50 may be eliminated and connecting passages may be incorporated in the surface of the plunger. In view of the fact that, with the exception of the opening 50, the body is identical to that previously described, the same identifying numerals have been employed. The plunger 51 used with this type of construction is also provided with a short projection 52 at its lower end which engages the base of the socket 14 in the bottom closure 13. The plunger 51 is provided with two slots in opposite sides of the plunger, the slots 53 extending through the wall of the plunger and communicating with the socket 54 which corresponds to the socket 23. In order to provide a communication between the inlet port 15 and the interior of the socket 14, a pair of diametrically opposed grooves 55 are provided which extend longitudinally of the plunger 51, providing passages which are continually connecting the groove 16 with the socket 14. Accordingly, these passages 55 take the place of the passage 50 in the construction illustrated in FIGURES 1 and 2. The structure shown in FIGURES 3 and 4 is otherwise similar to that shown in FIGURES 1 and 2.

In accordance with the patent statutes, I have described the principles of construction and operation of my improvement in pressure relief valve, and while I have endeavored to set forth the best embodiment thereof, I desire to have it understood that changes may be made within the scope of the following claim without departing from the spirit of my invention.

I claim:
A pressure valve including,
a valve body including an elongated bore,
a plunger slidable longitudinally of said elongated bore and having an axial socket at one end thereof,
closed chamber means at one end of said bore against which the other end of said plunger may engage to limit movement of said plunger in one direction,
an axial projection on said other end of said plunger,
said body including an inlet port communicating with said bore outwardly of said plunger and normally closed by said plunger,
said plunger including a passage therethrough from the the periphery thereof to said axial socket and normally closed by the wall of said bore,
said passage communicating with said inlet port upon movement of said plunger away from one end of said bore,
a passage connecting said inlet port with said one end of said bore,
said body including an outlet port communicating with the other end of said bore,
a rotatable shank having one end extending axially through the said valve body at said other end of said bore,
the other end of said shank having an axial socket therein,
a spring guide having one end slidable in said last-named socket and having a pointed other end engaged in an axial indentation in the bore of the socket in said plunger,
the end of said spring guide engaging the bore of said socket in said plunger being of smaller diameter than this socket to permit the plunger and guide to move into and out of axial alignment,
peripheral shoulder means on said spring guide intermediate its ends,
a threaded plug threaded into said other end of said bore,
a spring interposed between said shoulder means and plug to urge said plunger toward said one end of said bore,
said plug having an axial aperture therethrough, through which said shank extends, and
cooperable means on said shank and plug to permit relative axial, but not rotatable movement of said plug relative to said shank.

References Cited in the file of this patent

UNITED STATES PATENTS

| 306,385 | Crosby | Oct. 14, 1884 |
| 1,643,305 | Lalor | Sept. 27, 1927 |
| 2,411,930 | Mathys | Dec. 3, 1946 |
| 2,704,549 | Strnad | Mar. 22, 1955 |
| 2,931,305 | Stratton | Apr. 5, 1960 |

FOREIGN PATENTS

| 277,107 | Switzerland | Aug. 15, 1951 |
| 723,375 | Great Britain | Feb. 9, 1955 |